United States Patent [19]

Kimura

[11] Patent Number: 5,239,646
[45] Date of Patent: Aug. 24, 1993

[54] DATA TRANSMISSION METHOD AND DATA PROCESSING SYSTEM USING THE SAME

[75] Inventor: Makoto Kimura, Inzaimachi, Japan

[73] Assignee: Fujitsu Limited, Kawasaki, Japan

[21] Appl. No.: 547,031

[22] Filed: Jul. 2, 1990

[30] Foreign Application Priority Data

Jun. 30, 1989 [JP] Japan .................................. 1-170741

[51] Int. Cl.$^5$ .............................................. G06F 11/00
[52] U.S. Cl. ................................. 395/575; 364/239.7; 364/285.1; 364/268.9; 371/66; 371/12; 365/226
[58] Field of Search ... 364/200 MS File, 900 MS File; 371/66, 12; 365/226, 228

[56] References Cited

U.S. PATENT DOCUMENTS

| | | | |
|---|---|---|---|
| 4,445,176 | 4/1984 | Burk | 364/200 |
| 4,498,145 | 2/1985 | Baker | 364/900 |
| 4,507,751 | 3/1985 | Gawlick | 364/900 |
| 4,922,456 | 5/1990 | Naddor | 371/66 X |
| 5,014,187 | 5/1991 | Debize | 364/200 |

FOREIGN PATENT DOCUMENTS 0096199 12/1983 European Pat. Off. .
1505603 3/1978 United Kingdom .

OTHER PUBLICATIONS

Patent Abstracts of Japan, vol. 12, No. 161, May 17, 1988 & JP-A-62 274 330 (NEC Corp.), Nov. 28, 1987.

*Primary Examiner*—Robert W. Beausoliel, Jr.
*Assistant Examiner*—Lu V. Hua
*Attorney, Agent, or Firm*—Staas & Halsey

[57] ABSTRACT

A data transmission method is provided which transfers data to an adapter from a processor module and transfers the data to an input/output device from the adapter. The method includes the following steps. The first step is to transfer data from the processor module to a data buffer provided in the adapter. The data buffer has a storage capacity equal to or greater than a predetermined storage capacity. The second step is to determine whether or not an error occurs in the processor module during the first step. The third step is to determine whether or not the data has been completely transferred to the data buffer provided in the adapter without having any error. The fourth step is to transfer the data in the data buffer provided in the adapter to the input/output device when the third step determines that the data has been completely transferred without error to the data buffer provided in the adapter. The data in the data buffer provided in the adapter is not transferred to the input/output device when the second step determines that the error occurs in the processor module during the first step before the data has been completely transferred to the input/output device.

25 Claims, 14 Drawing Sheets

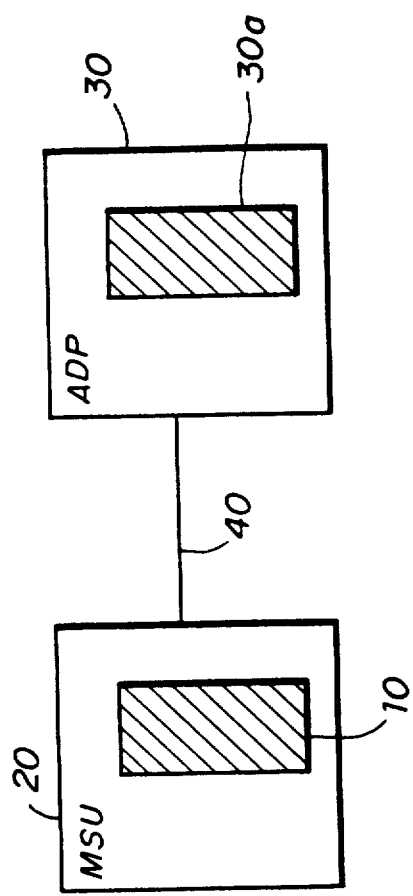
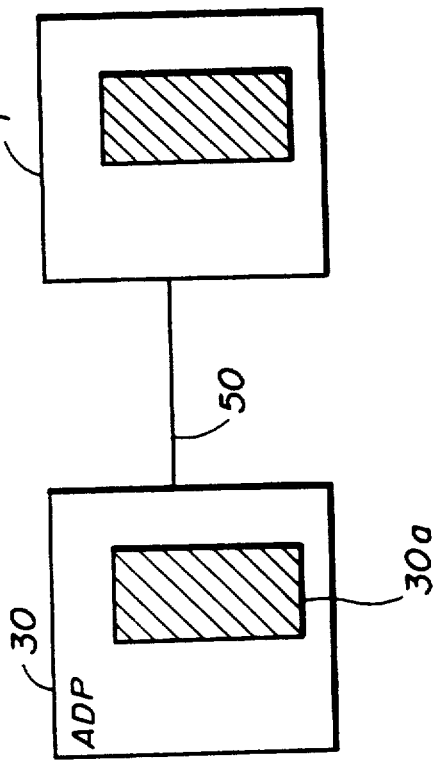

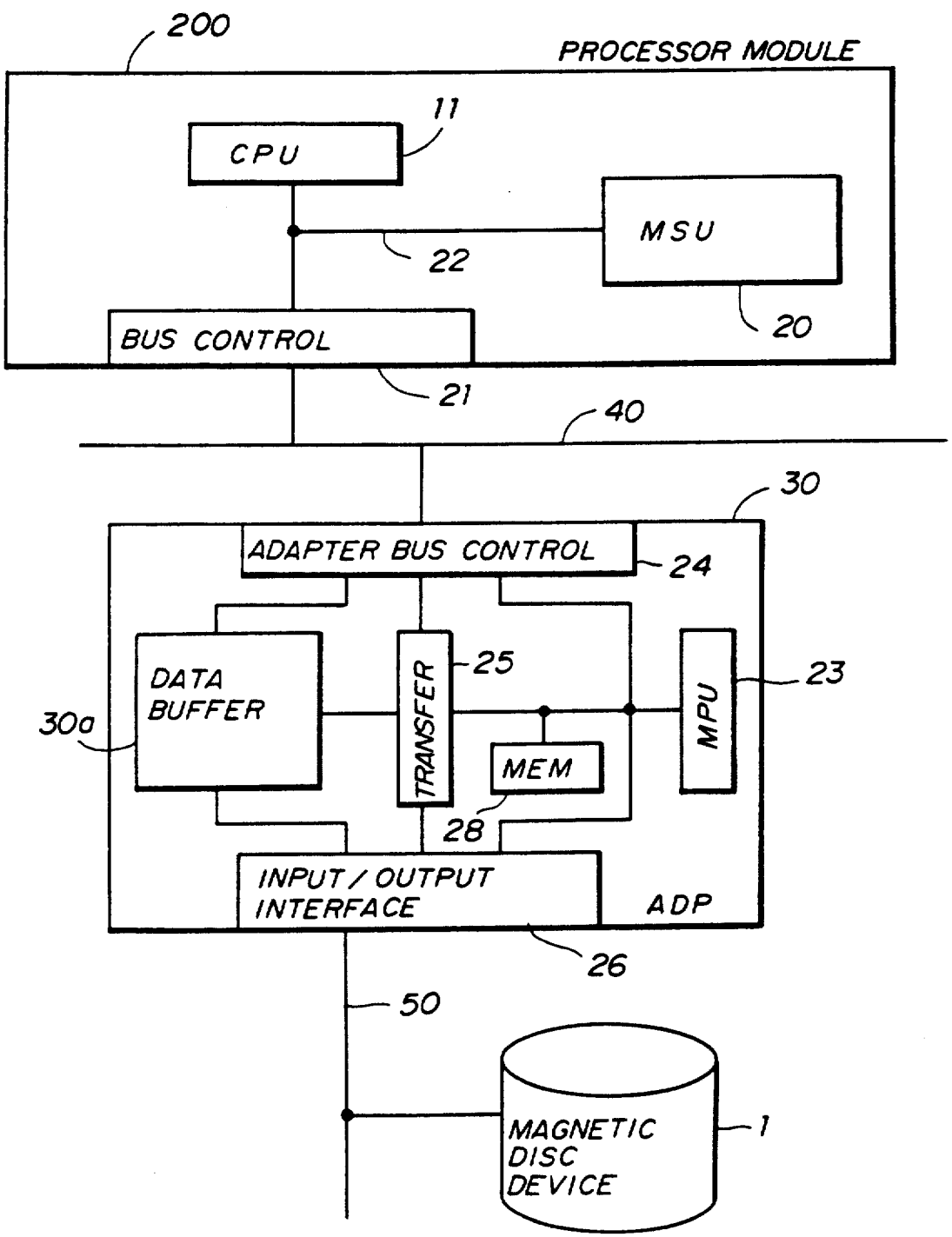

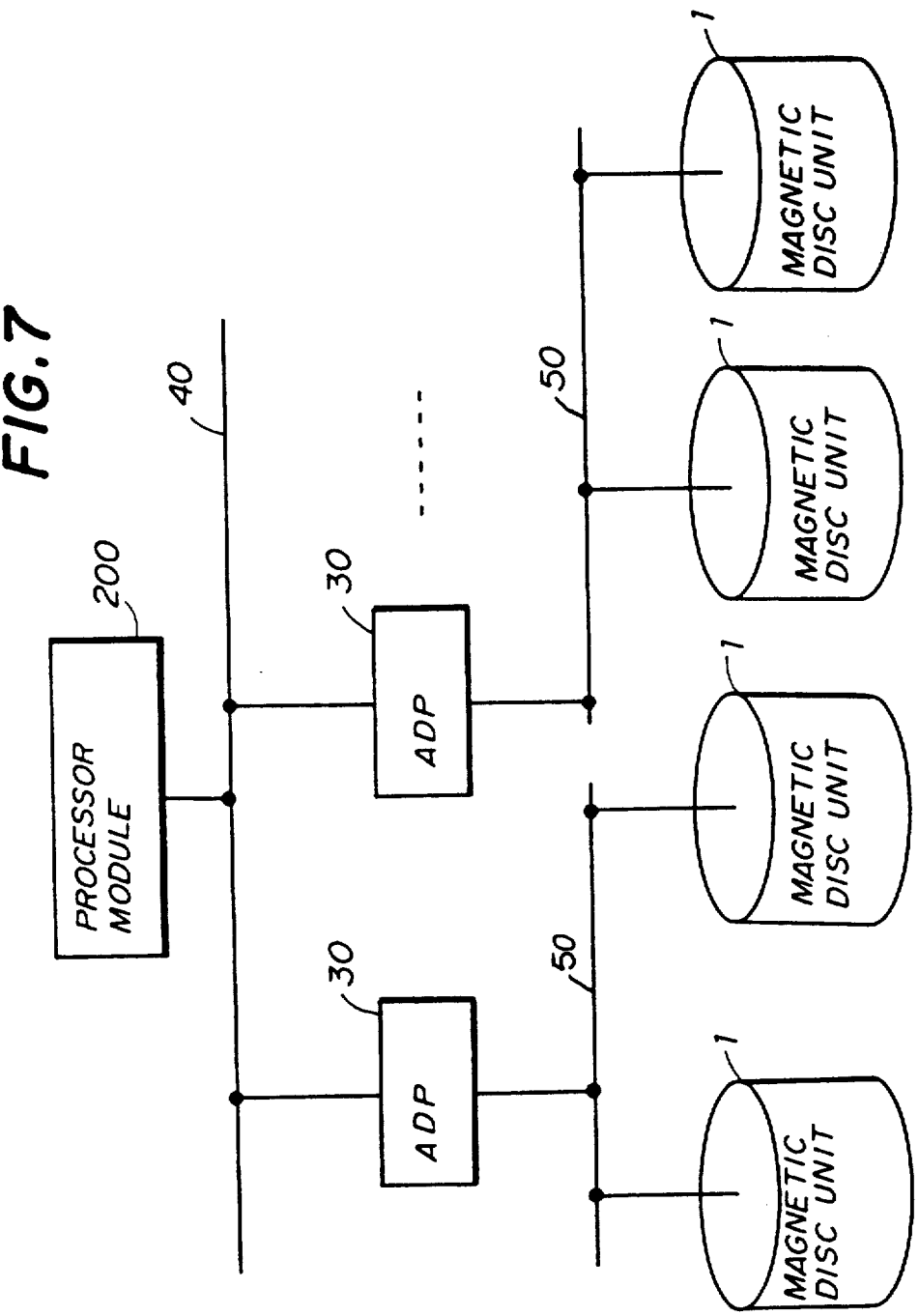

| | BIT 0 | 16 | 31 |
|---|---|---|---|
| WORD 0 | STATUS | NEXT DVC | PREV DVC |
| 1 | COMMAND CODE / FLAG | DATA COUNT | |
| 2 | MSU DATA ADDRESS | | |
| 3 | CURRENT COMMAND ADDRESS | | |
| 4 | STATUS BLOCK ADDRESS | | |

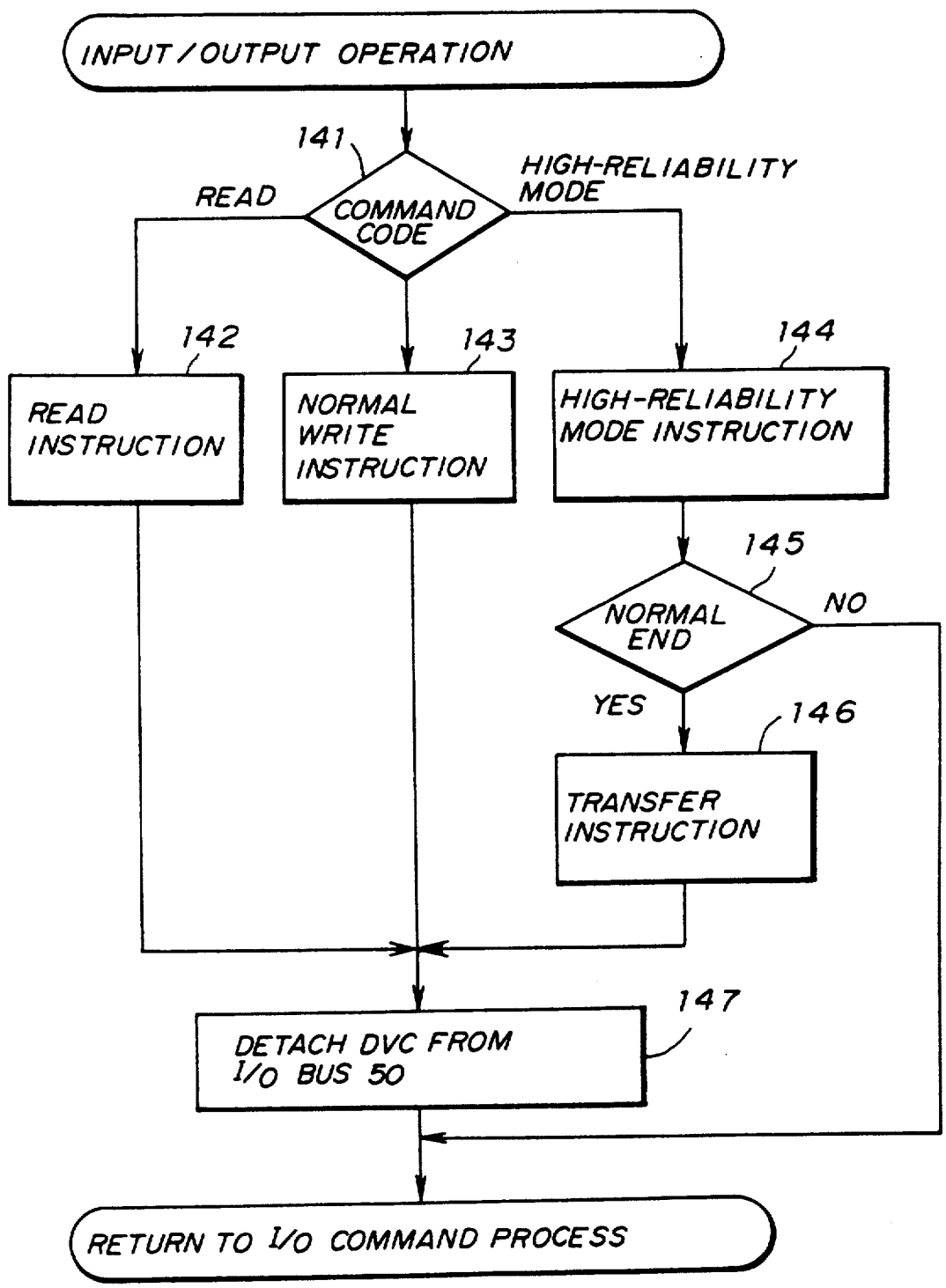

DATA TRANSMISSION METHOD AND DATA PROCESSING SYSTEM USING THE SAME

BACKGROUND OF THE INVENTION

1. Field of the Invention

The present invention generally relates to a data transmission method and a data transmission system using the same. More particularly, the present invention is concerned with a data transmission which is executed when data stored in an input/output device (storage unit), such as a magnetic disc unit is renewed or updated.

2. Description of the Related Art

There is known a database system which has an input/output device, such as a large-capacity magnetic disc unit. It is necessary to refer to or renew data in the input/output device in real time when a terminal or an external computer system generates a data read/write or renewal request. In such a database system, it is necessary to prevent data in the input/output device from being destroyed due to the occurrence of a hardware fault in a central processing unit or other structural elements in the database system.

A conventional database system has a historical log file, which stores information about the status of a currently executed process which indicates that data is being renewed and which stores data indicating the area which is to be accessed. The historical log file also has renewed data itself. In a case where data in the input/output device is renewed, the above-mentioned information and data is written into the historical log file under the control of a central processing unit in the database system. After that, the procedure for renewing data in the input/output device is started. Even if an error takes place during the renewal procedure due to a fault in the CPU and thus data is destroyed, it is possible to restore the destroyed data from the information and data stored in the historical log file. For example, the CPU refers to the historical log file and obtains data which is subjected to the renewal procedure from the historical log file. Then, the CPU executes the same renewal procedure again.

Generally, data is written into the input/output device in a predetermined data unit, called a physical block. Even when data to be renewed amounts to a few bytes, the entire physical block containing the above data is read out from the input/output device and the related data contained in the entire physical block is renewed. Then, the entire physical block containing the renewed data is written into the input/output device.

The above-mentioned conventional procedure will be further described with reference to FIG. 1. Portion (A) of FIG. 1 illustrates the status of the input/output device obtained before the renewal procedure is carried out. Generally, a data base which is composed of a plurality of physical blocks is stored in an input/output device 1. The input/output device 1 has a physical block 1a which is one of the plurality of physical blocks. The physical block 1a is written into a main storage unit (MSU) 2 managed by a CPU (not shown), and a (hatched) portion of the physical block 1a to be renewed is replaced by renewal data 2a (FIG.1-(B)). The physical block 1a having the renewal data 2a is written into the input/output device 1 again, and recognized to be a new physical block 1a' (FIG.1-(c)). The renewal procedure is carried out in physical block units. For this reason, even if data to be renewed is equal to a few bytes, it is necessary to read out the entire physical block containing the above data and then replace the data with renewal data and write the entire physical block containing the renewal data into the input/output device.

It is known to use an input/output adapter which is provided between the main storage unit MSU managed by the CPU and the input/output device which is of, for example, a disc drive unit. A data transfer between the MSU and the input/output adapter is carried at the same time as a data transfer between the input/output adapter and the input/output device.

This procedure will be described with reference to FIG. 2. The MSU 2 shown in (A) of FIG. 2 stores a physical block 10 which has been renewed. The physical block 10 has an area 10a which has been transferred to the input/output device 1, an area 10b which has been transferred to an input/output adapter (ADP) 3, and an area 10c which has not yet been read out from the MSU 2. When a predetermined amount of data is transferred from the MSU 2 to a data buffer 3a built in the input/output adapter 3, the data being considered is transferred to the input/output device 1 in a first-in first-out (FIFO) process, starting from the beginning of the received data. The input/output adapter 3 drives a bus 4 provided between the MSU 2 and the input/output adapter 3, and an input/output bus 5 between the input/output adapter 3 and the input/output device 1 at the same time. Thus, it is possible to reduce the time it takes to renew data. In addition, it is unnecessary to form the data buffer 3a of a large capacity memory means.

However, the renewal procedure shown in FIG.2 has the following disadvantages. When a fault occurs in the CPU, MSU 2, bus 4 or the like during data transfer, the procedure for transferring data from the input/output adapter 3 to the input/output device 1 is stopped. In this case, data on the side of the input/output device 1 is not renewed completely so that data may be damaged. A case will be considered where the data transfer operation between the input/output adapter 3 and the input/output device 1 is stopped while the input/output device 1 is inputting data from the input/output adapter 3. In this case, special data (binary "0", for example) is written into the data in place of data which is not output by the input/output adapter 3. This is due to the fact that an error check code must be processed in the physical block unit. The above-mentioned procedure is called padding and is well known in the field of magnetic disc units.

In order to realize the padding process, it is necessary to store the entire physical block in the historical log file. For example, it is necessary to store the entire physical block (consisting of hundreds to thousands of bytes) even if data to be renewed is equal to one byte. In addition, the historical log file must be referred to without exception before data in the input/output device 1 is renewed. After all necessary data and information in the historical log file are renewed, data in the input/output device 1 is renewed. Thus, an increase in the amount of data stored in the historical log file increases the time it takes to renew data as well as the time it takes to respond to a request output by a terminal coupled to the database system being considered. Furthermore, a large-capacity storage device is required when the data amount to be processed is great.

SUMMARY OF THE INVENTION

It is a general object of the present invention to provide an improved data transfer method in which the aforementioned disadvantages are eliminated.

A more specific object of the present invention is to provide a data transfer method capable of accurately transferring data to an input/output device at higher speeds.

The above objects of the present invention are achieved by a data transmission method of transferring data to an adapter from a processor module and transferring the data to an input/output device from the adapter, having the following steps of:

(a) transferring data from the processor module to a data buffer provided in the adapter, the data buffer having a storage capacity equal to or greater than a predetermined storage capacity;

(b) determining whether or not an error occurs during the step (a);

(c) determining whether or not the data has been completely transferred to the data buffer provided in the adapter without having any error; and (d) transferring the data in the data buffer provided in the adapter to the input/output device when the step (c) determines that the data has been completely transferred to the data buffer provided in the adapter, wherein the data in the data buffer provided in the adapter is not transferred to the input/output device when the step (b) determines that the error occurs in the processor module during the step (a) before the data has been completely transferred to the input/output device.

Another object of the present invention is to provide a data processing system which uses the above-mentioned data transfer method.

This object of the present invention is achieved by a data processing system comprising:

main memory means for storing data;

a bus coupled to the main memory means;

data buffer means, coupled to the bus, for storing data;

first transfer means, coupled to the bus, for transferring the data in the main memory means to the data buffer means through the bus, the data buffer having a storage capacity equal to or greater than a predetermined storage capacity;

first determining means for determining whether or not an error occurs during the time when the data in the main memory means is being transferred to the data buffer means;

second determining means, coupled to the first transfer means, for determining whether or not the data has been completely transferred to the data buffer means without having any error;

an input/output bus coupled to the data buffer means;

an input/output device and coupled to the input/output bus; and second transfer means, coupled to the input/output bus, for transferring the data in the data buffer means to the input/output device when the second determining means determines that the data has been completely transferred from the main memory means to the data buffer means irrespective of the fact that the first determining means determines that the error occurs, wherein the data in the data buffer means is not transferred to the input/output device when the first determining means determines that the error occurs before the second determining means determines that the data has been completely transferred to the input/output device.

The above-mentioned object of the present invention is also achieved by a data processing system comprising:

main memory means for storing data;

a bus coupled to the main memory means;

a plurality of data buffers, coupled to the bus, for storing data through the bus;

first transfer means, coupled to the bus, for transferring the data in the main memory means to one of the data buffers, each of the data buffers having a storage capacity equal to or greater than a predetermined storage capacity;

first determining means for determining whether or not an error occurs during the time when the data in the main memory means is being transferred to the one of the the data buffers;

second determining means, coupled to the first transfer means, for determining whether or not the data has been completely transferred to the one of the data buffers without having any error;

an input/output bus coupled to the data buffers;

a plurality of input/output devices coupled to the input/output bus; and second transfer means, coupled to the input/output bus, for transferring the data in the one of the data buffers to one of the input/output devices when the second determining means determines that the data has been transferred from the main memory to the one of the data buffers irrespective of the fact that the first determining means determines that the error occurs, wherein the data in the one of the data buffers is not transferred to the one of the input/output devices when the second determining means determines that the error occurs before the data has been completely transferred to the one of the input/output devices.

BRIEF DESCRIPTION OF THE DRAWINGS

Other objects, features and advantages of the present invention will become apparent from the following detailed description when read in conjunction with the accompanying drawings, in which:

FIGS. 5A and 5B are diagrams illustrating the data transfer operation of the data processing system shown in FIG. 4;

FIG. 6 is a block diagram of a more detailed structure of the data processing system shown in FIG. 5;

FIG. 7 is a block diagram of a variation of the structure shown in FIG. 6;

FIG. 14 is a flowchart of an input/output operation of the data processing system shown in FIGS. 6 and 7.

DESCRIPTION OF THE PREFERRED EMBODIMENTS

Figure 3:
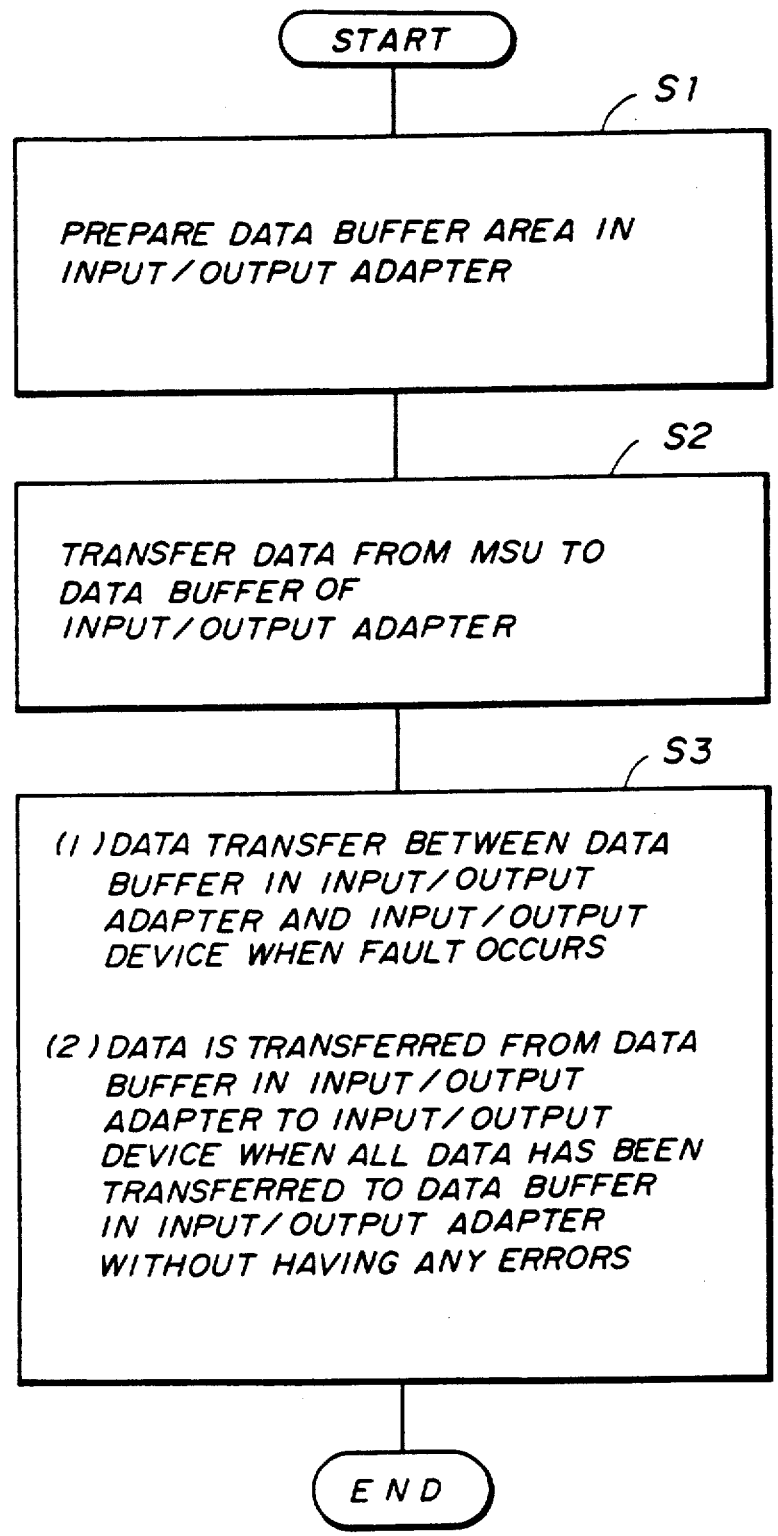
FIG. 3 is a flowchart illustrating the principle of a data transfer method according to the present invention.

A description will now be given of the principle of the data transfer method according to the present invention with reference to FIG. 3. The data transfer method according to the present invention is applied to a system which includes an input/output device into which a predetermined amount of data is written when writing data therein. Further, the system includes an input/output adapter provided between a CPU and the input/output device. The first step of the data transfer procedure is to prepare, in a buffer area in the input/output adapter, a data buffer area having a storage capacity equal to or greater than a predetermined capacity (step 1). Then the CPU starts to transfer data equal to the above-mentioned predetermined capacity from a main storage unit (MSU) to the data buffer of the input/output adapter (step 2). At subsequent step 3, the data transfer between the data buffer in the input/output adapter and the input/output device is not carried out when a fault occurs in the CPU, the MSU or the like during the data transfer operation. On the other hand, when all data has been transferred from the MSU to the data buffer in the input/output adapter without having any fault, the data in the data buffer of the input/output adapter is transferred to the input/output device irrespective of whether or not a fault occurs in the CPU, the MSU or the like.

When it is possible to determine whether data in the input/output device is data before or after renewal, a fault recovery procedure can be executed as follows. The physical block containing data to be renewed or updated is read out from the input/output device and written into the MSU. The data to be renewed in the MSU is revised and then written into the input/output device. Thus, it is possible to store only renewal data in the historical log file to reduce the time it takes to write data into the historical log file. In addition, it is possible to use a reduced storage capacity historical log file. Thus, the historical log file may be a semiconductor memory device. As a result, it becomes possible to build an economical, high-reliability and high-speed database system.

Figure 4:
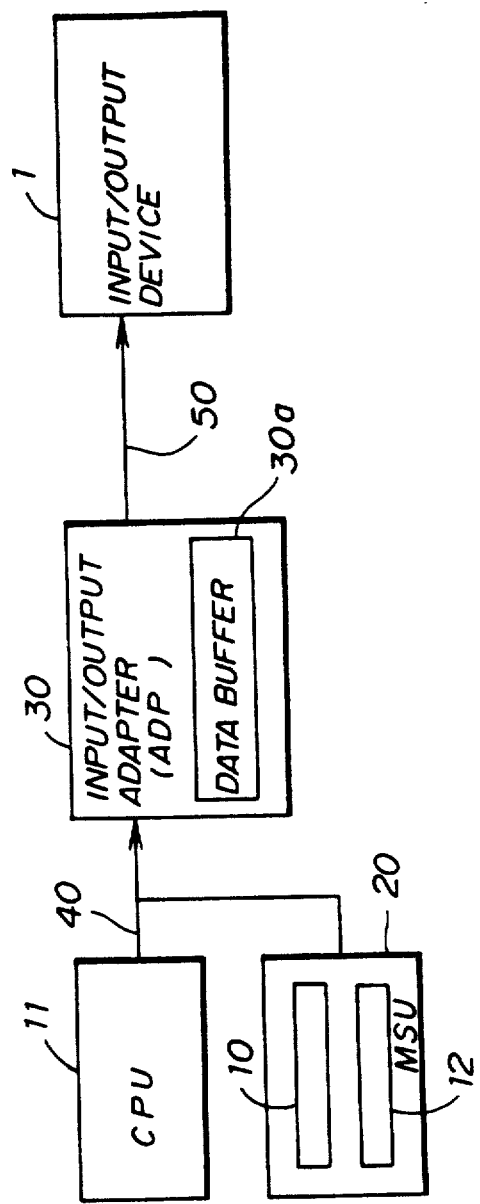
FIG. 4 is a block diagram illustrating a data processing system according to a preferred embodiment of the present invention.

A description will now be given of a data processing system according to a preferred embodiment of the present invention. Referring to FIG. 4, a data processing system is composed of a central processing unit (CPU) 11, a main storage unit (MSU) 20, an input/output adapter (ADP) 30 and the input/output device 1. A bus 40 is connected between the CPU 11, the MSU 20 and the input/output adapter 30. An input/output bus 50 is connected between the input/output adapter 30 and the input/output device 1. The MSU 20 has a physical block 10 and a historical log file 12, which stores information about update or renewal data. The historical log file 12 is formed of a battery-backup memory so that the contents thereof can be maintained without being damaged when the system is down. The input/output adapter 30 has a data buffer 30a.

Information about data to be renewed is stored in the historical log file 12. Next, the CPU 11 reads out the physical block 10 to be renewed from the input/output device 1 and writes the same into the MSU 20. The physical block 10 is rewritten in accordance with the historical log file 12.

The CPU 11 transfers the physical block 10 which has been renewed to the data buffer 30a in the input/output adapter 30. FIGS. 5A and 5B illustrate a data transfer procedure. Referring to FIG. 5A, the physical block 10 in the MSU 20 is transferred to the data buffer 30a through the bus 40 under the control of the CPU 11. If a fault occurs in the CPU 11, MSU 20, the bus 40 or the like during the data transfer operation, the input/output adapter 30 does not carry out data transfer to the input/output device 1. Thus, data in the input/output device 1 is never destroyed. When the CPU 11 confirms that all data has been transferred to the data buffer 30a in the input/output adapter 30, as shown in FIG. 5B, the adapter 30 starts to transfer the data in the data buffer 30a to the input/output device 1. After the data transfer from the MSU 20 to the input/output adapter 30 is completed, data in the data buffer 30a of the input/output adapter 30 is transferred to the input/output device 1 even if a fault occurs in the CPU 11, the MSU 20, the bus 40 or the like. It should be noted that in this case, the contents of the input/output device 1 can be renewed correctly.

FIG. 6 is a block diagram of a more detailed configuration of the data processing system shown in FIG. 5. In FIG. 6, those parts which are the same as those shown in FIG. 5 are given the same reference numerals. The system shown in FIG. 6 is composed of a processor module 200, the input/output module 30 and the input/output device 1 formed of a magnetic disc unit. The bus 40 connects the processor module 200 and the input/output adapter 30. The input/output bus 50 connects the input/output adapter 30 and the magnetic disc apparatus 1.

The processor module 200 is composed of the CPU 11, the MSU 20, a bus control circuit 21 and an internal bus 22. The input/output adapter 30 is composed of a main processing unit (MPU) 23, an adapter bus control circuit 24, a data transfer controller 25, an input/output counter interface controller 26, an internal bus 27, a memory 28 and the data buffer 30a.

Figure 1:
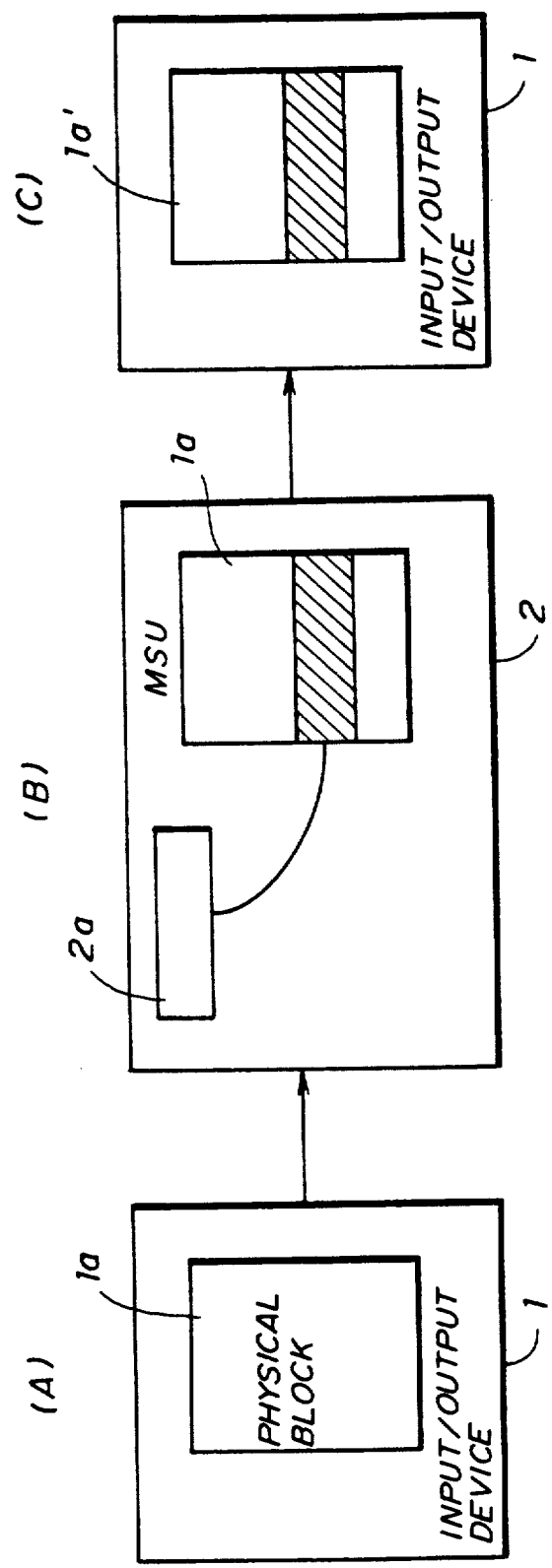
FIG. 1 is a block diagram illustrating a conventional data transfer method.
Figure 2:
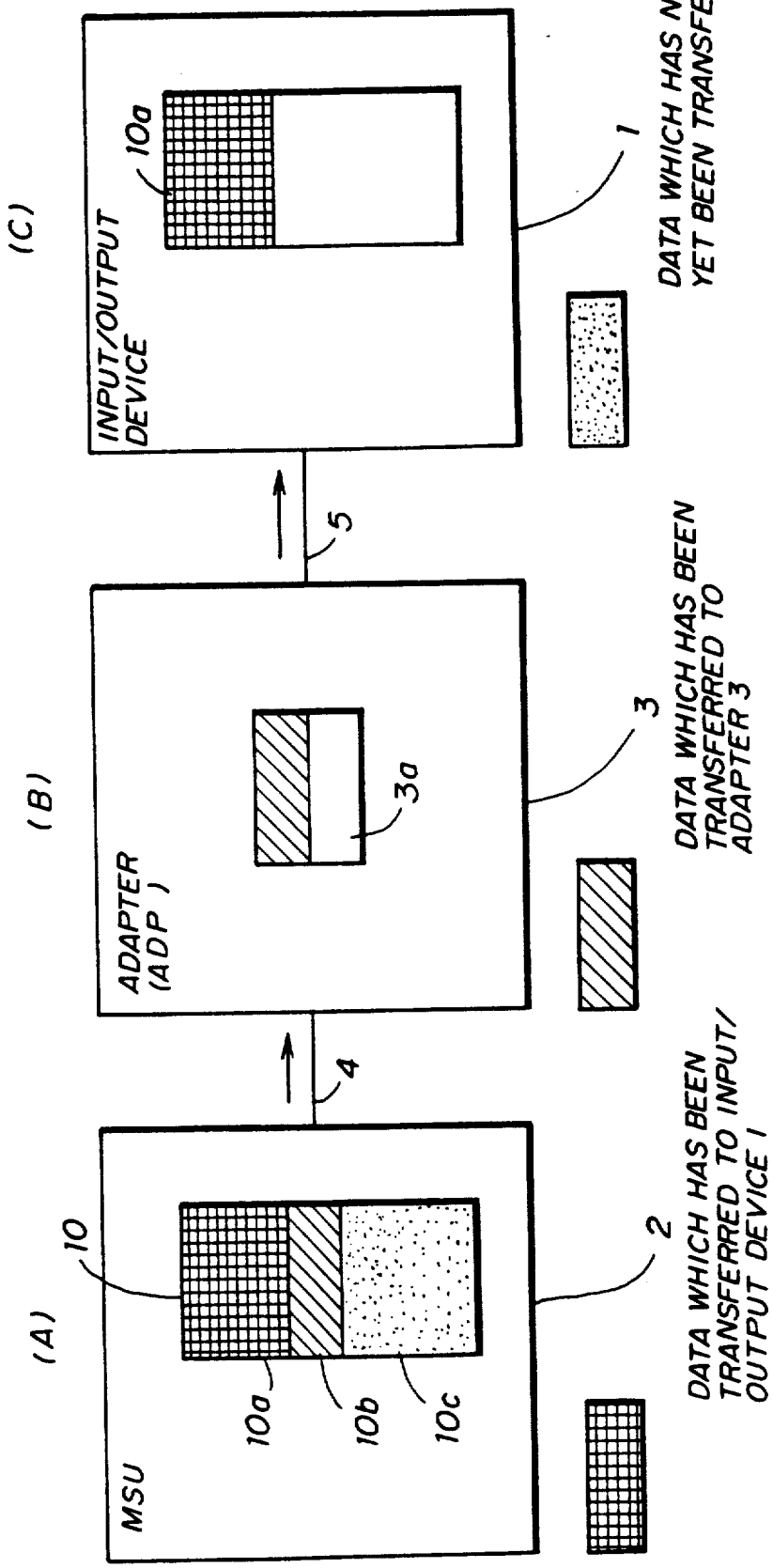
FIG. 2 is a block diagram illustrating another conventional data transfer method.

When the CPU 11 acknowledges the occurrence of a renewal request (input/output request), it sends, through the bus control circuit 21, the input/output adapter 30 information about a beginning address related to data which is to be renewed and the size of the data. The information is transferred on the bus 40 and then input to the adapter bus controller 24 of the input/output adapter 30. The information is then supplied to the MPU 23 through the internal bus 27, and the MPU 23 analyzes the content of the received information. It will be noted that there are two transfer (write) modes, one of which is a normal mode and the other of which is a high-reliability mode. In the normal mode, data transfer is carried out in the way shown in FIG. 2. In the high-reliability mode, the data transfer is carried out in the way shown in FIGS. 5A and 5B.

It is now assumed that the information produced and output by the CPU 11 indicates the high-reliability mode. In this case, the MPU 23 instructs the data transfer controller 25 to input data read out from the MSU 20 of the processor module 200 through the adapter bus controller 24. If the adapter bus controller 24 informs the data transfer controller 25 of the occurrence of an error related to the processor module 200 or the bus 40 during the time when data is being transferred from the MSU 20 to the data buffer 30a, the data transfer controller 25 stops the data transfer, and reports the occurrence of a fault to the MPU 23. In response to this report, the MPU 23 stops the input/output operation (data transfer).

When the data transfer controller 25 of the input/output adapter 30 determines that all data equal to one physical block have been stored in the data buffer 30 without having any errors, the data transfer controller 25 instructs the input/output interface controller 26 to transfer the data to the magnetic disc unit 1. The input/output interface controller 26 transfers the data from the data buffer 30a to the magnetic disc unit 1 through the input/output bus 50 so that the contents of the magnetic disc unit 1 are renewed or updated.

If a fault occurs in the input/output bus 50 or the magnetic disc unit 1 during the time when data is being transferred to the magnetic disc unit 1, the MPU 23 reports the occurrence of the fault to the CPU 11. When all data has been transferred to the magnetic disc unit 1 without having any errors, the MPU 23 reports the completion of data transfer to the CPU 11. The CPU 11 understands the contents of the report from the MPU 23, and determines whether the renewal and transfer procedure should be ended or a recovery procedure should be carried out. The recovery procedure is executed when a fault occurs in the magnetic disc unit 1. In the recovery procedure, an alternative magnetic disc unit (not shown) is renewed, for example. That is, data is read out from the data buffer 30a again and written into the alternative magnetic disc unit. Thus, it is sufficient to generate only an instruction which indicates that data is written into the alternative magnetic disc unit.

FIG. 7 is a variation of the configuration shown in FIG. 6. A data processing system shown in FIG. 7 is made up of the processor module 200, a plurality of input/output adapters 30 and a plurality of magnetic disc units 1. The adapters 30 are connected to the bus 40. On the other hand, each of the adapters 30 is connected to one of the input/output buses 50. A plurality of magnetic disc units 1 are connected to each of the the input/output buses 50. The processor module 200 is configured in the way as that shown in FIG. 6. Each of the input/output adapters 30 is the same as the input/output adapter 30 shown in FIG. 6.

Figure 8A:
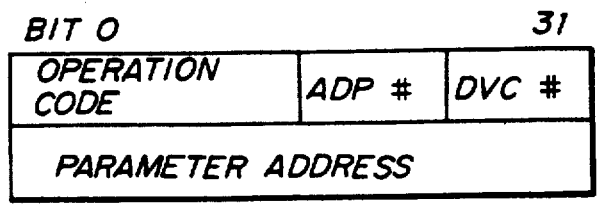
FIGS. 8A through 8D are diagrams illustrating data and information managed by a processor module shown in FIGS. 6 and 7.
Figure 10:
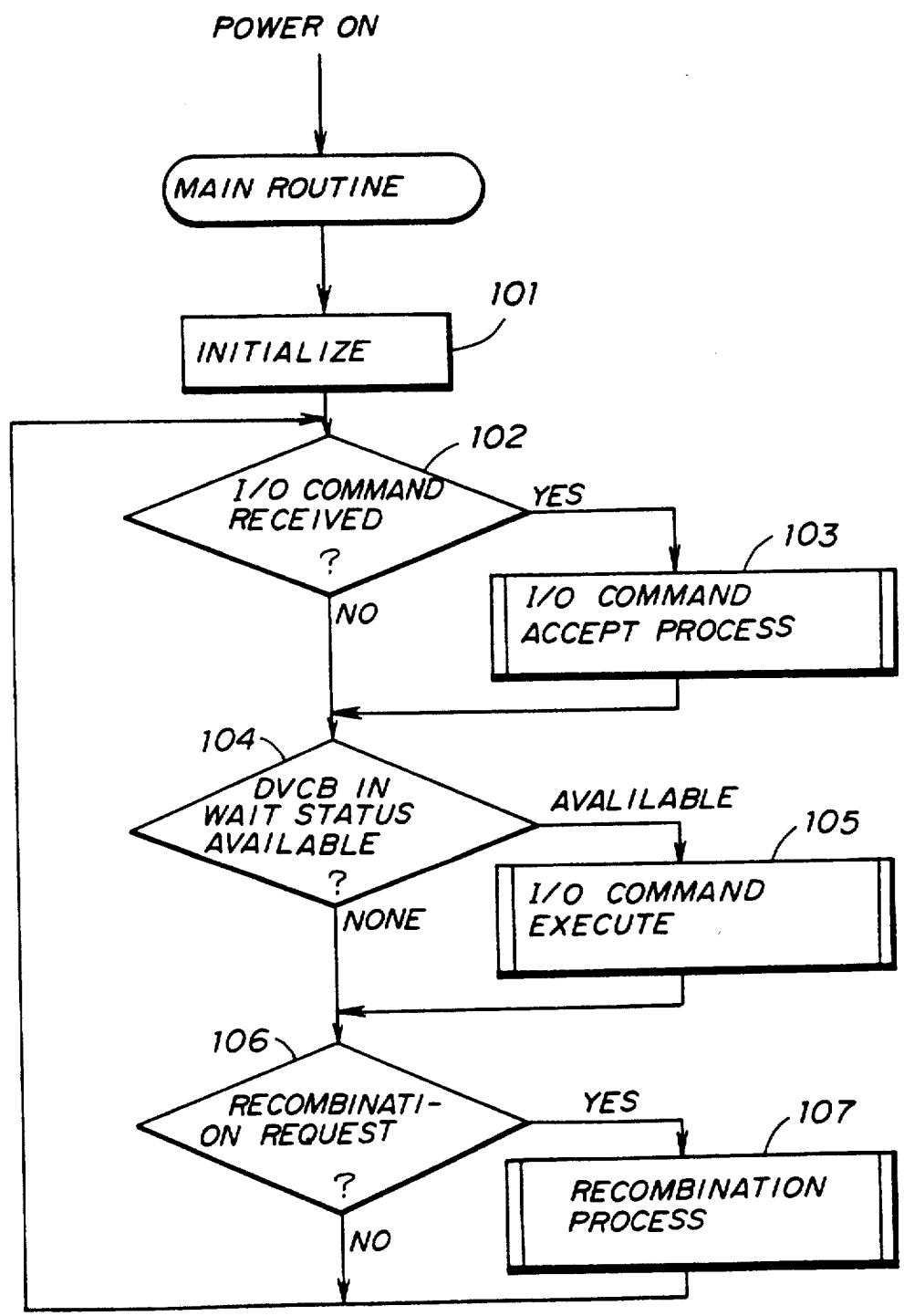
FIG. 10 is a flowchart of a main routine executed by the input/output adapter shown in FIGS. 6 and 7.

FIGS. 8A through 8D show data managed by the CPU 11 of the processor module 200 shown in FIG. 7. Referring to FIG. 8A, there is illustrated an input/output command, which is composed of an operation code, an input/output adapter number APT#, a input/output device number DVC#, and a parameter address. When the operation code is equal to 0001, it indicates that a DVC operation should be started. The DVC operation is illustrated in FIG. 10. When the operation code is equal to 0002, it indicates that the DVC operation should be cleared. The input/output adapter number ADP# indicates one of the input/output adapters 30 shown in FIG. 7. The input/output device number DVC# indicates one of the input/output devices 1 (magnetic disc units) shown in FIG. 7.

Figure 8B:
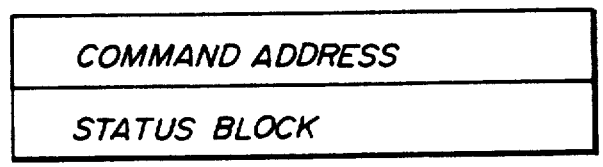
Figure 8C:
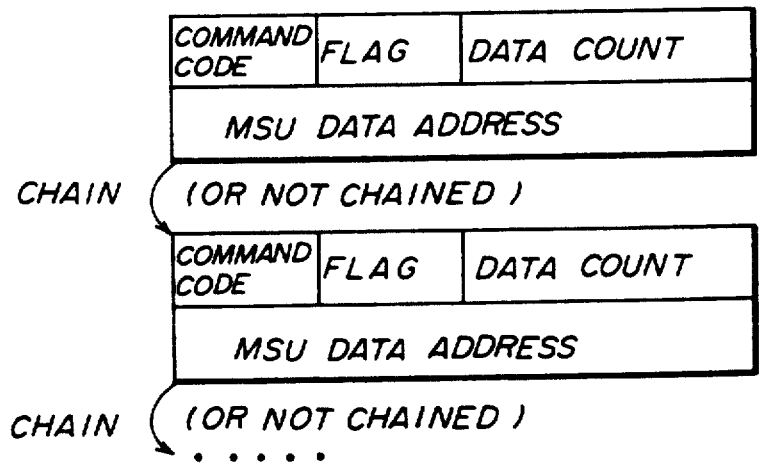
Figure 8D:
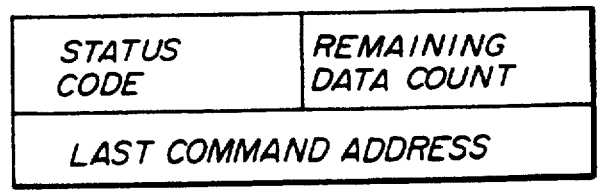

The parameter address of the input/output command shown in FIG. 8A indicates a command address and a status block, as shown in FIG. 8B. The command address indicates an area in the MSU 20 in which a command shown in FIG. 8C is stored. The command is composed of a command code, a flag, a data count and an MSU data address. When the command code is equal to 01, it indicates the normal mode. When the command code is equal to 03, it indicates the high-reliability mode. When the command code is equal to 02, it indicates a read mode in which data is transferred from one of the magnetic disc units 1 to the processor module 200. The data count indicates the amount or of data counts to be transferred. The MSU data address indicates the start address of an area of the MSU 20 in which the data to be transferred is stored. It is possible to chain a plurality of commands together so that a plurality of procedures are instructed by a single input/output command. It is also possible to chain a plurality of data pieces together so as to be recognized to be a single data piece.

The status block contained in the parameter shown in FIG. 8 is composed of a status code, the number of remaining data counts and a last command address. The relationship between the possible values of the status code and corresponding meanings of the status code is shown in Table 1.

TABLE

| Status code | Meaning |
| --- | --- |
| 0001 | normal end |
| 0002 | device error |
| 0003 | parameter error |
| 0004 | interface error. |

The number of remaining amount of data indicates the amount of data left when a command was executed last. The last command address indicates the address of the command which was executed last. The CPU 11 of the processor module 200 can acknowledge the status of the execution obtained when the command was executed last.

Figures 9A, 9B:
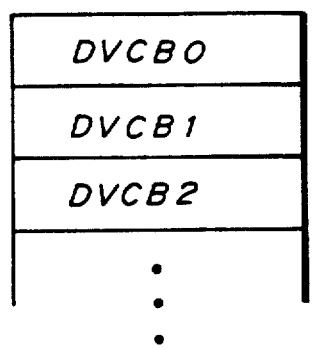
FIGS. 9A and 9B are diagrams illustrating control information managed by an input/output adapter shown in FIGS. 6 and 7.

Each of the input/output adapters 30 manages control information shown in FIGS. 9A and 9B. Referring to FIG. 9A, there is illustrated a device control block of (DVCB) control information. The DVCB control information contains control information about each of the magnetic disc units 1. For example, DVCB0 denotes control information about the magnetic disc unit DVCO.

The control information about each of the magnetic drive units 1 has the contents shown in FIG. 9B. The control information is composed of five words 0–4. Word 0 is composed of a status code, a next DVC number, and a previous DVC number. When the status code is equal to 0000, it indicates the status where no command is executed. When the status code is equal to 0001, it indicates a wait status where the input/output command being considered is connected to a DVC queue and the input/output adapter 30 is waiting for the occurrence of a state where the input/output bus 50 becomes idle. When the status code is equal to 0002, it indicates a work status where the magnetic disc unit 1 being considered is connected to the input/output bus 50 and the input/output command is being executed. When the status code is equal to 0003, it indicates a disc state where the magnetic disc unit 1 being considered is operating (seeking some data) in the state where it is detached from the input/output adapters 30. The Next DVC indicates the number of the magnetic disc unit 1 which will be connected to the end of a DVC which is connected to the DVC queue in the wait status (0001). The previous DVC indicates the number of the magnetic disc unit 1 which will be connected to the beginning of a DVC which is connected to the DVC queue in the wait status.

Word 1 is composed of the command code, a flag and a data count, which are identical to those shown in FIG. 8C. Word 2 relates to the MSU data address shown in FIG. 8C. Words 1 and 2 indicate the contents of the command which is being executed or waiting for execution. When the status code indicates the disc state (0003), words 1 and 2 indicate the intermediate progress of execution.

Word 3 relates to a current command address which indicates the address of a command which is executed or waiting for execution. Word 4 relates to a status block address of the status block shown in FIG. 8D which is obtained and stored when the execution of the input/output command is completed.

FIG. 10 is a flowchart of a main routine which is executed by each of the input/output adapters 30. A procedure of the main routine is defined in the memory 28 in each of the input/output adapters 30 shown in FIG. 6. After the power supply to each of the input/output adapters 30 is turned ON, an initialization procedure is carried out (step 101). The MPU 23 determines whether or not the aforementioned input/output command produced and output by the processor 200 has been received (step 102). When the input/output command has been received, the MPU 23 executes an input/output command accepting procedure (step 103).

Figure 11:
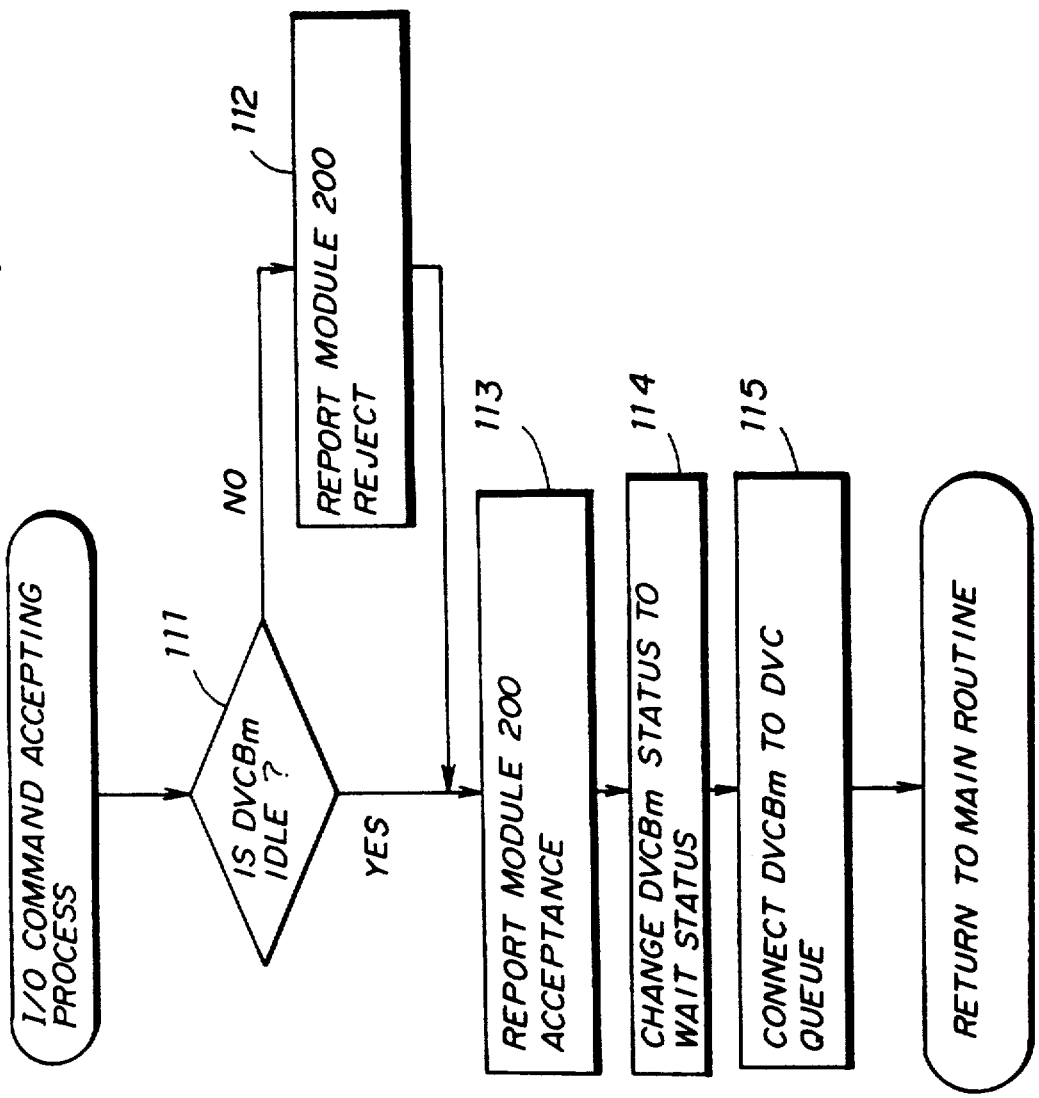
FIG. 11 is a flowchart of an input/output command accepting procedure executed by the input/output adapter shown in FIGS. 6 and 7.

FIG. 11 is a flowchart of the input/output command accepting procedure executed at step 103. The procedure shown in FIG. 11 relates to a case where the input/output command received at step 102 (FIG. 10) is addressed to the magnetic disc unit 1 having number DVCBm. The MPU 23 refers to the control information DVCBm (FIG. 9B) about the magnetic disc unit DVCm. Then, the MPU 23 determines whether the magnetic disc unit DVCm is in the idle status. When the result obtained at step 111 is NO, the MPU 23 sends the processor module 200 a response which indicates that the input/output command is rejected (step 112). When it is determined that the result at step 111 is idle, step 113 is executed. The MPU 23 sends the processor module 200 a response which indicates that the input/output command has been accepted (step 113). Then, the MPU 23 changes the status of the magnetic disc unit DVCBm to the wait status (step 114). Then, the MPU 23 connects the control information DVCBm about the magnetic disc unit DVCm. After that, the input/output command accepting procedure returns to the main routine shown in FIG. 10.

Turning now to FIG. 10, the MPU 23 determines whether or not there is available a magnetic disc unit which is in the wait status (step 104) When it is determined that a magnetic disc unit in the wait status is available, the MPU 23 executes the input/output command (step 105).

Figure 12:
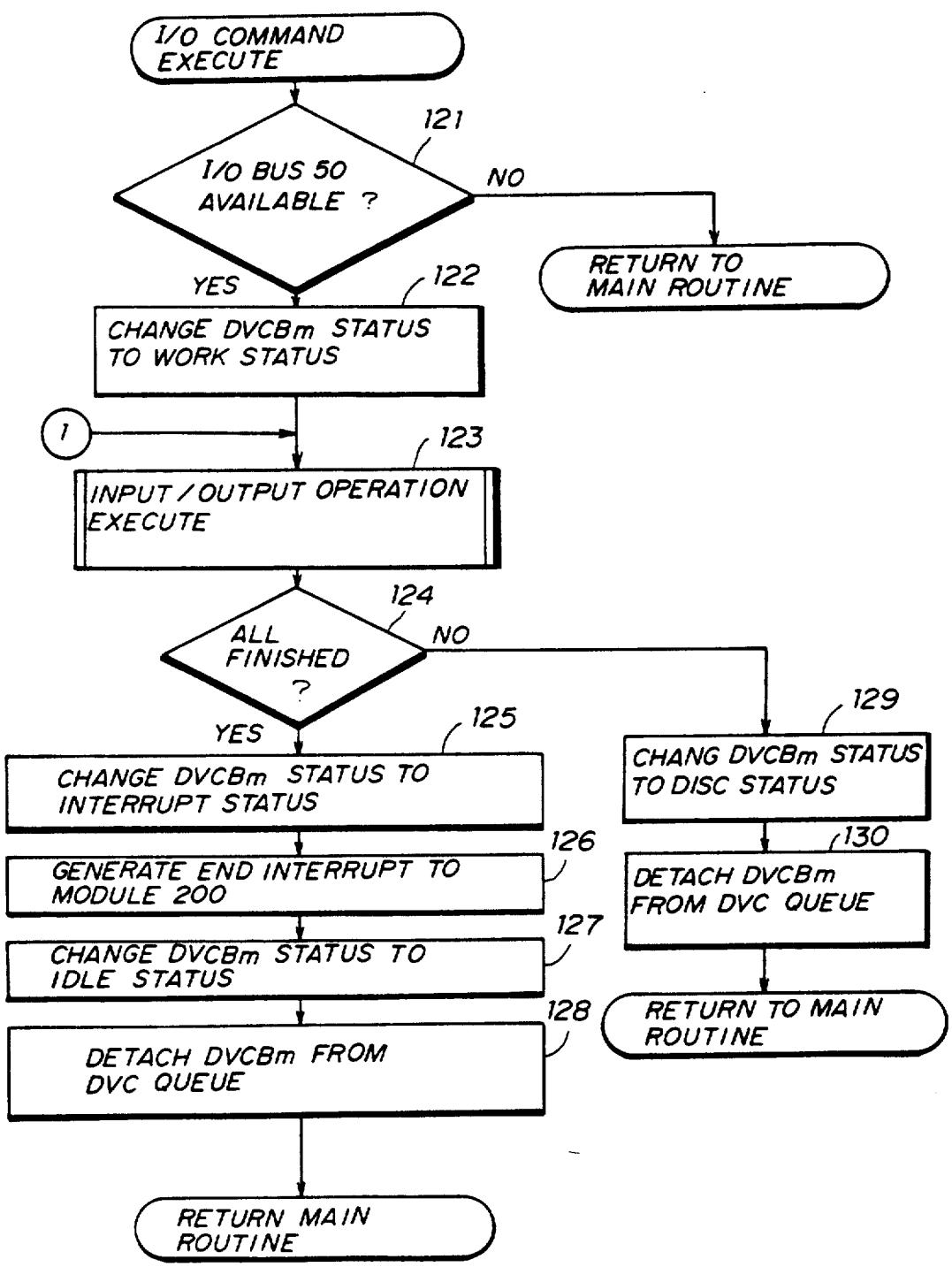
FIG. 12 is a flowchart of an input/output command execution procedure performed by the input/output adapter shown in FIGS. 6 and 7.

FIG. 12 is a flowchart of the execution of the input/output command. The procedure shown in FIG. 12 relates to a case where the top (beginning) of the DVCB queue is DVCBm. The MPU 23 determines whether or not the input/output bus 50 is being used (step 121). When it is determined that the input/output bus 50 is being used, the procedure returns to the main routine shown in FIG. 10. On the other hand, when it is determined that the input/output bus 50 is idle, the MPU 23 changes the status of DVCBm to the work status (step 122). Then, the input/output operation is executed under the control of the MPU 23 (step 123). Data is read out from the data buffer 30a (FIG. 6) and is then transferred to the magnetic disc unit DVCm. The MPU 23 determines whether or not all the operation is completed (step 124). When the result obtained at step 125 is YES, the MPU 23 changes the status of DVCMm to the interrupt status (step 125). Then, the MPU 23 generates an end interrupt addressed to the processor module 126 (step 126). After that, the MPU 23 changes the status of DVCBm to the idle status (step 127). Finally, the MPU 23 detaches DVCBm from the DVC queue (step 128). Then, the procedure returns to the main routine shown in FIG. 10.

On the other hand, when the result obtained at step 124 is NO, the MPU 23 changes the status of DVCBm to the disc status (step 129). After that, the MPU 23 detaches DVCBm from the DVC queue (step 130). Then, the procedure returns to the main routine shown in FIG. 10.

Figure 13:
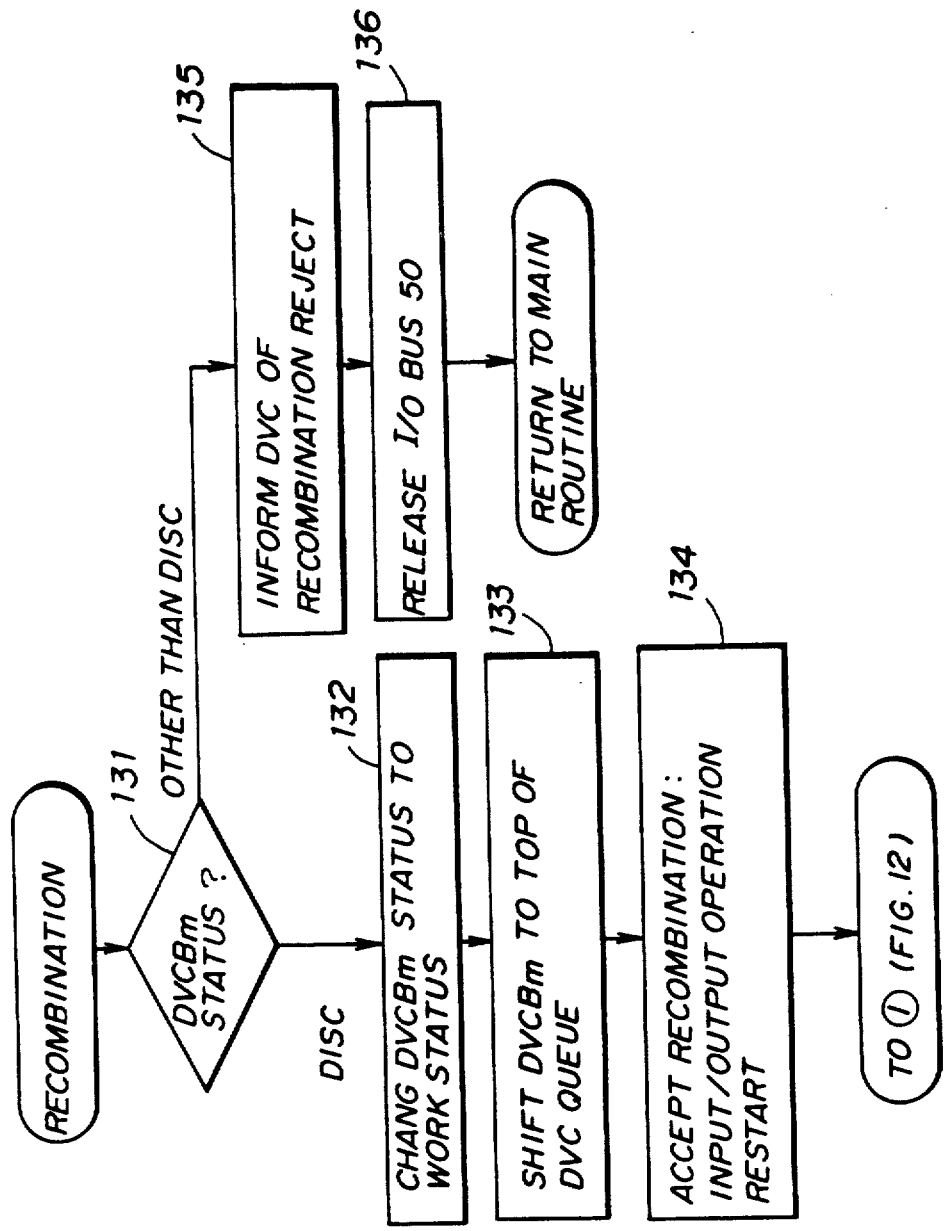
FIG. 13 is a flowchart of a recombination procedure executed by the input/output adapter shown in FIGS. 6 and 7.

Turning now to FIG. 10, the MPU 23 determines whether or not a recombination request is generated (step 106). FIG. 13 is a flowchart of the recombination procedure executed at step 107. The flowchart shown in FIG. 13 relates to a case where a recombination request is generated from the magnetic disc unit DVCm. The MPU 23 determines whether or not the status of DVCBm is in the disc status (step 131). When the result obtained at step 131 is YES, the MPU 23 changes the status of DVCBm to the work status (step 132). Then, the MPU 23 shifts the DVCBm to the top of the DVC queue (step 133). After that, a recombination acceptance input/output operation is started again (step 134). Then, the procedure proceeds to step 123 shown in FIG. 12. On the other hand, when the result obtained at step 131 is NO, the MPU 23 informs the magnetic disc drive DVCm of the rejection of the recombination command (step 135). Then, the input/output bus 50 is released under the control of the MPU 23 (step 136). Then, the procedure returns to the main routine shown in FIG. 10.

FIG. 14 is a flowchart of the input/output operation. The MPU 23 determines what is indicated by the command code contained in the command received from the processor module 200 (step 141). When it is determined that the read operation is instructed (command code being equal to 02), the MPU 23 instructs the adapter bus controller 24, the input/output interface controller 26 and the data transfer controller 25 to operate in the read mode (step 142). In the read mode, data is read out from the related magnetic disc unit 1 and transferred to the MSU 20 through the input/output adapter 30. When it is determined, at step 141, that the normal write mode is instructed (command code being equal to 01), the MPU 23 instructs the adapter bus controller 24, the input/output interface controller 26 and the data transfer controller 25 to operate in the normal write mode (step 143). When it is determined, at step 144, that the high-reliability mode is instructed, the MPU 23 instructs the adapter bus controller 24 and the data transfer controller 25 to input data from the MSU 20 into the data buffer 30a. Then, the MPU 23 determines whether or not the transfer operation has been completed without having any errors (step 145). When the result at step 145 is YES, the MPU 23 instructs the data transfer controller 25 and the input/output interface controller 26 to transfer data from the data buffer 30a to the related magnetic disc unit 1 (step 146). On the other hand, when the result obtained at step 145 is NO, the procedure returns to the input/output command process.

Step 147 is executed after step 142, step 143 or step 146 is executed. At step 147, the MPU 23 waits for the completion of disconnection of the corresponding magnetic disc unit 1 from the input/output bus 50.

The input/output device is not limited to the magnetic disc unit but can be formed of an alternative storage unit. In the aforementioned embodiment, the historical log file 12 is provided in the MSU 20. Alternatively, it is possible to store the historical log file in the input/output device 1. That is, it is necessary to maintain the contents of the historical log file even if the system is down. It is possible to describe the programs of the procedures shown in FIGS. 10 through 14 in the form of a microprogram. In this case, the input/output adapter 30 functions are performed by firmware. It is possible to drive the processor module 200, the bus 40 and the input/output adapters 30 with individual clock signals.

The present invention is not limited to the specifically disclosed embodiments, and variations and modifications may be made without departing from the scope of the present invention.

What is claimed is:

1. A data transfer method for transferring data to an adapter from a processor module and transferring the data to an input/output device from the adapter, said data transmission method comprising the steps of:
   (a) transferring data from said processor module to a data buffer provided in the adapter, said data buffer having a storage capacity equal to or greater than a predetermined storage capacity;
   (b) determining whether an error occurs in said transferring step (a);
   (c) determining whether the data has been completely transferred to said data buffer provided in the adapter during the step (a); and
   (d) transferring the data in said data buffer to said input/output device when the data has been completely transferred to said data buffer,
   wherein the data in said data buffer is not transferred to said input/output device when step (b) determines that the error occurs during step (a) before the data has been completely transferred to said data buffer.

2. A data transfer method as claimed in claim 1, wherein the step (d) transfers said data in said data buffer to said input/output device in a predetermined physical block unit.

3. A data transfer method as claimed in claim 1, wherein said data includes renewal data, and said data transfer method further comprising the step of renewing a portion of said data to be transferred to said input/output device using the renewal data stored in a historical log file so that said data including said renewal data is transferred to said data buffer provided in said adapter.

4. A data transfer method as claimed in claim 1, wherein said input/output device comprises a storage unit which stores the data transferred by the step (d).

5. A data transfer method as claimed in claim 1, wherein said step (b) comprises the step of detecting said error which occurs in said processor module, said adapter and said input/output device.

6. A data processing system, comprising:
   main memory means for storing data;
   data buffer means, operatively connected to said main memory means, for storing the data and having a storage capacity equal to or greater than a predetermined storage capacity;
   first transfer means for transferring the data from said main memory means to said data buffer means;
   first determining means, operatively connected to said first transfer means, for determining whether an error occurs during a time when the data in said main memory means is being transferred from said first transfer means to said data buffer means;
   second determining means for determining whether the data has been completely transferred from said first transfer means to said data buffer means;
   an input/output device, operatively connected to said data buffer means; and
   second transfer means for transferring the data from said data buffer means to said input/output device when said second determining means determines that the data has been completely transferred from said main memory means to said data buffer means,
   wherein the data in said data buffer means is not transferred to said input/output device when said first determining means determines that the error occurs before said second determining means determines that the data has been completely transferred to said data buffer means.

7. A data processing system as claimed in claim 6, further comprising:
   a historical log file memory which stores renewal data; and
   renewal means for renewing a portion of said data to be transferred to said input/output device by using said renewal data stored in said historical log file memory so that said first transfer means transfers data containing said renewal data to said data buffer means.

8. A data processing system as claimed in claim 7, wherein said historical log file comprises a non-volatile memory.

9. A data processing system as claimed in claim 8, wherein said data buffer means has a storage capacity which is equal to or greater than a storage capacity corresponding to said predetermined physical block unit.

10. A data processing system as claimed in claim 7, wherein said input/output device has a first storage area into which the data transferred by said second transfer means is written, and a second storage area which functions as said historical log file.

11. A data processing system as claimed in claim 6, wherein said first transfer means transfers the data in said data buffer means to said input/output device in a predetermined physical block unit.

12. A data processing system as claimed in claim 6, further comprising an adapter connected between said main memory means and said input/output device, wherein said adapter includes said data buffer means, said first determining means, said second determining means and said second transfer means.

13. A data processing system as claimed in claim 6, wherein said input/output device comprises a storage unit which stores the data transferred by said second transfer means.

14. A data processing system as claimed in claim 6, further comprising a processor module which includes said main memory means.

15. A data processing system, comprising:
main memory means for storing data;
data buffers, operatively connected to said main memory means, and each having a storage capacity equal to or greater than a predetermined storage capacity;
first transfer means for transferring the data in said main memory means to one of said data buffers;
first determining means, operatively connected to said first transfer means, for determining whether an error occurs during a time when the data in said main memory means is being transferred from said first transfer means to said one of the said data buffers;
second determining means for determining whether the data has been completely transferred from said first transfer means to said one of the data buffers;
input/output devices operatively connected to said data buffers; and
second transfer means for transferring the data from one of the data buffers to one of said input/output devices when said second determining means determines that the data has been transferred from said main memory to said one of the data buffers, wherein the data in said one of the data buffers is not transferred to said one of the input/output devices when said first determining means determines that the error occurs before said second determining means determines that the data has been completely transferred to said one of the data buffers.

16. A data processing system as claimed in claim 15, further comprising processing means for generating an input/output command which includes information indicating which one of the data buffers should be selected, wherein said first transfer means transfers the data in said main memory means to the selected one of the data buffers in accordance with said information included in said input/output command.

17. A data processing system as claimed in claim 16, wherein said input/output command includes device information indicating which one of the input/output devices should be selected, and wherein said second transfer means transfers the data in said one of the data buffers to said one of the input/output devices in accordance with said device information included in said input/output command.

18. A data processing system as claimed in claim 16, further comprising a processor module which includes said processing means and said main memory means.

19. A data processing system as claimed in claim 15, further comprising a plurality of adapters, each of which is provided between said main memory means and said input/output devices and each of which includes one of the data buffers.

20. A data processing system as claimed in claim 15, further comprising:
a historical log file memory which stores renewal data; and
renewal means for renewing a portion of said data to be transferred to said one of the input/output devices by said renewal data stored in said historical log file memory so that said first transfer means transfers data containing said renewal data to the selected one of the data buffers.

21. A data processing system as claimed in claim 20, wherein said historical log file comprises a non-volatile memory.

22. A data processing system as claimed in claim 15, wherein said first transfer means transfers the data in said one of the data buffers to said one of the input/output devices in a predetermined physical block unit.

23. A data processing system as claimed in claim 15, wherein each of said input/output devices comprises a storage unit, which stores the data transferred by said second transfer means.

24. An input/output adapter, connecting a processor and a magnetic disk, comprising:
an adapter bus control circuit, connected to the processor;
a data buffer, connected to said adapter bus control circuit;
a data transfer controller, connected to said adapter bus control circuit and to said data buffer;
a memory, connected to said data transfer controller and to said adapter bus control circuit;
an interface controller, connected to said data buffer, said data transfer controller, said memory, and said adapter bus control circuit; and
a processing unit, connected to said adapter bus control, said data transfer controller, said memory, and said interface controller.

25. An input/output adapter as claimed in claim 24, wherein said adapter bus control circuit receives address and size information related to data to be renewed, and informs the data transfer controller of an error related to the processor or communication therewith;
said data transfer controller steps data transfer and reports a fault to said processing unit upon being informed of an error by said adapter bus control circuit, and instructs said interface controller to transfer the data to the magnetic disk upon determining that a physical block of the data has been stored in said data buffer without any errors;
said processing unit stops the data transfer responsive to report of the fault by said data transfer controller; and
said interface controller transfers the data from said data buffer to the magnetic disk to review the data.

* * * * *